US012274901B2

(12) United States Patent
Strasser et al.

(10) Patent No.: US 12,274,901 B2
(45) Date of Patent: Apr. 15, 2025

(54) SELF-SECURING DEVICE PREVENTING A COMMUNICATION MEANS FROM REMAINING IN AN UNDEFINED INTERMEDIATE POSITION

(71) Applicant: Phillip Strasser, Hinterbrühl (AT)

(72) Inventors: Philipp Strasser, Hinterbrühl (AT); Azarm Bahman, Fairfield, CT (US)

( * ) Notice: Subject to any disclaimer, the term of this patent is extended or adjusted under 35 U.S.C. 154(b) by 0 days.

(21) Appl. No.: 18/279,829

(22) PCT Filed: Dec. 13, 2021

(86) PCT No.: PCT/EP2021/085404
§ 371 (c)(1),
(2) Date: Aug. 31, 2023

(87) PCT Pub. No.: WO2022/184305
PCT Pub. Date: Sep. 9, 2022

(65) Prior Publication Data

US 2024/0131373 A1 Apr. 25, 2024
US 2024/0226619 A9 Jul. 11, 2024

(30) Foreign Application Priority Data

Mar. 2, 2021 (DE) ..................... 10 2021 104 988.1

(51) Int. Cl.
*A62B 35/00* (2006.01)
*H01F 7/02* (2006.01)

(52) U.S. Cl.
CPC ...... *A62B 35/0075* (2013.01); *A62B 35/0087* (2013.01); *H01F 7/02* (2013.01)

(58) Field of Classification Search
CPC .... A62B 35/0075; A62B 35/0087; H01F 7/02
(Continued)

(56) References Cited

U.S. PATENT DOCUMENTS 4,423,796 A * 1/1984 Sulowski .................. E06C 7/18
182/8
6,474,442 B1 * 11/2002 Atkinson ................. A62B 1/14
104/115
(Continued)

FOREIGN PATENT DOCUMENTS

DE 102015113329 A1 2/2016
EP 2314355 A1 4/2011
WO WO 2008/049143 A1 5/2008

OTHER PUBLICATIONS

English Translation of DE102015113329A1, Applicant Heinz Richard 9 pages (Year: 2016).*
(Continued)

*Primary Examiner* — Muhammad Ijaz
(74) *Attorney, Agent, or Firm* — Womble Bond Dickinson (US) LLP

(57) ABSTRACT

The invention relates to a self-securing device for securing a person, having: a first fastening element for fastening to a securing element; a second fastening element for fastening to a securing element; a communication means for communicating between the first fastening element and the second fastening element such that, in a first posture of the communication means, the first fastening element can be operated and the second fastening element is blocked and, in a second posture of the communication means, the first fastening element is blocked and the second fastening element can be operated; and a control mechanism for controlling the communication means to prevent the communication means from remaining in an undefined intermediate posture between the first posture and the second posture.

9 Claims, 5 Drawing Sheets

(58) Field of Classification Search
USPC ........................................................ 248/205.1
See application file for complete search history.

(56) References Cited

U.S. PATENT DOCUMENTS

| | | | | | |
|---|---|---|---|---|---|
| 6,488,118 | B1 * | 12/2002 | Corriveau | A62B 35/0056 | 104/111 |
| D639,356 | S * | 6/2011 | Kassel | D21/662 | |
| 8,360,202 | B1 * | 1/2013 | Woodard | A62B 1/16 | 182/4 |
| 8,657,068 | B2 * | 2/2014 | Gassner | A63B 29/02 | 182/12 |
| 9,174,072 | B2 | 11/2015 | Strasser | | |
| 10,092,784 | B2 * | 10/2018 | Dehondt | F16B 45/027 | |
| 11,433,263 | B1 * | 9/2022 | Bishop | G08B 21/02 | |
| 2002/0175024 | A1 * | 11/2002 | Kurtgis | A62B 35/0075 | 182/18 |
| 2002/0175025 | A1 * | 11/2002 | Kurtgis | A62B 35/0075 | 182/3 |
| 2008/0060872 | A1 * | 3/2008 | Wise | A62B 35/0006 | 182/3 |
| 2010/0012425 | A1 * | 1/2010 | Gassner | A62B 35/0087 | 182/5 |
| 2019/0070444 | A1 * | 3/2019 | Seman | A62B 35/0037 | |
| 2019/0118011 | A1 * | 4/2019 | Patton | F16G 11/12 | |
| 2020/0101330 | A1 * | 4/2020 | Blackford | A62B 35/0093 | |
| 2022/0241624 | A1 * | 8/2022 | Jarusiewic | A62B 35/0006 | |
| 2023/0149751 | A1 * | 5/2023 | Foreman | A62B 35/0006 | 182/3 |
| 2023/0347190 | A1 * | 11/2023 | Thurk | A62B 35/0075 | |
| 2024/0075324 | A1 * | 3/2024 | Mauthner | A62B 35/0075 | |
| 2024/0131373 | A1 * | 4/2024 | Strasser | A62B 35/0087 | |
| 2024/0307717 | A1 * | 9/2024 | Lingo | A62B 35/04 | |

OTHER PUBLICATIONS

German Office Action for DE Application No. 10 2021 104 988.1 dated Dec. 6, 2021, 5 pages.
Written Opinion for PCT/EP2021/085404 dated Apr. 19, 2022, 10 pages.
International Search Report for PCT/EP2021/085404 dated Apr. 19, 2022, 5 pages.

* cited by examiner

SELF-SECURING DEVICE PREVENTING A COMMUNICATION MEANS FROM REMAINING IN AN UNDEFINED INTERMEDIATE POSITION

CROSS-REFERENCE TO RELATED APPLICATION

This application is a national stage application, filed under 35 U.S.C. § 371, of International Patent Application No. PCT/EP2021/085404, filed on Dec. 13, 2021, claiming priority of the German patent application DE 10 2021 104 988.1, filed on Mar. 2, 2021, both being incorporated by reference herein in its entirety.

FIELD OF INVENTION

The invention relates to a self-securing device.

ART BACKGROUND

WO 2008/049143 A1 discloses a self-securing set with two carabiners which can be hooked into securing points and can be blocked against opening by means of a blocking device and which are each attached to a connecting piece connected to a person securing himself, the blocking devices of the two carabiners being coupled by means of a coupling means. Furthermore, a securing means for the carabiners is provided which, when a carabiner is hooked into the securing point and the securing means is actuated, blocks it against opening by means of its blocking device, the blocking device of the second carabiner being actuated via the coupling means in such a way that the second carabiner is released for opening, so that only one of the carabiners can be opened at any time. The coupling means can be implemented, for example, by means of a Bowden cable.

Under unfavorable circumstances, it can happen that such a coupling means, for example a Bowden cable, enters an undefined state in which, for example, either both carabiners can be actuated or both carabiners are locked.

SUMMARY OF THE INVENTION

There is a need to provide fault robust operation of a self-securing device.

This need is achieved by a self-securing device having the features according to the independent patent claim. According to an embodiment of the present invention, a self-securing device for securing a person is provided, the self-securing device comprising a first fastening element (for example a first carabiner) for fastening to a securing element (for example a safety rope), a second fastening element (for example a second carabiner) for fastening to a securing element (for example the same or another safety rope), a communication means (for example a Bowden cable) for communicating between the first fastening element and the second fastening element such that in a first posture of the communication means the first fastening element is actuatable and the second fastening element is locked, and in a second posture of the communication means the first fastening element is locked and the second fastening element is actuatable, and a control mechanism for controlling the communication means to prevent the communication means from remaining or permanently remaining in an undefined intermediate posture between the first posture and the second posture.

According to one embodiment of the invention, a self-securing device is provided in which it is ensured that a communication means for communicating between two fastening elements is always transferred to a defined state corresponding to a defined posture of the communication means. More specifically, it can be ensured that the communication means is either in a first stable posture or in a second stable posture, wherein in a respective posture one of the two fastening elements is locked and the respective other fastening element is unlocked. For example, one carabiner can always be opened when another carabiner is closed and vice versa. This can ensure that a user of the securing device is secured to the securing element at all times by means of the currently locked securing element, while the user can rehang the currently unlocked other securing element, for example, between two securing elements or two positions of a securing element. Undefined, dangerous and/or function-impairing intermediate states can thus be reliably avoided, creating a self-securing device that can be operated in a fault-robust manner. In particular, preventing such undesirable intermediate states can preclude the self-securing device from being in a dangerous intermediate state in which both fastening elements are simultaneously unlocked and a user of the self-securing device is therefore not reliably secured throughout. Furthermore, the prevention of undesirable intermediate states can exclude a functional impairment to the extent that both fastening elements are locked at the same time and a user can no longer hang on to a securing element.

Additional embodiments of the self-securing device are described below.

According to a preferred embodiment, the control mechanism may be a magnetic control mechanism.

According to such an embodiment, the control mechanism can adjust magnetic forces acting on the communication means in such a way that the communication means can remain stable and permanent only in the first posture or in the second posture. This can be achieved by generating a respective local potential minimum of a magnetic element of the communication means exclusively in the first posture and in the second posture. In an intermediate posture, due to the magnetic forces set, the potential may be so unfavorable that the magnetic element of the communication means is automatically returned from this energetically unstable intermediate posture either to the first posture or to the second posture. A magnetic control mechanism is therefore a preferred embodiment, since in a non-contacting, thus low-friction, and precisely adjustable manner, persistence of the communication means in an unstable intermediate posture can be eliminated. Also, the provision of a magnetic control mechanism to prevent undefined postures of the communication means creates a maintenance-free and wear-free self-securing device over a long period of time. Clearly, a magnetic control mechanism can be used to eliminate an unstable equilibrium in an undesirable intermediate posture and, by setting magnetic forces accordingly, to achieve a return to one of the two stable postures.

Due to a locking in one of the two desired postures caused by magnetic force, there is advantageously in practice an acoustic and haptic feedback to a user, which makes the assumption of one of the two desired postures recognizable. If the user hears and/or feels (for example when a blocking device of a carabiner is actuated by means of a securing means on a safety rope, which can lead to a mechanical action on the communication means and consequently to an action on a blocking device of the other carabiner) that the self-securing device has assumed one of the two stable and safe desired postures, the user can be sure that the self-securing device can be used equally with a high degree of safety and full functionality.

As an alternative to a magnetic control mechanism, the control mechanism can also be formed using mechanical biasing elements, for example an arrangement of springs (for example helical springs and/or leaf springs) which always return the communication means to the first posture or to the second posture by spring forces if the communication means should temporarily be in an unstable intermediate posture.

According to an embodiment, the control mechanism may comprise two first magnetic elements arranged side by side, with respect to which a string of the communication means is movable, and may comprise a second magnetic element fixedly attached to the string. The positions of the two first magnetic elements may correspond to a position according to the first posture and a position according to the second posture of the communication means. In the case of a Bowden cable as communication means, a longitudinally displaceable string formed, for example, as a steel cable may be guided at least in sections inside a sheath. This string may be equipped with a second magnetic element which moves back and forth with the string during operation. The magnetic elements can be designed in such a way that their magnetic interaction allows the string to move back and forth, but permits the string and thus the communication means to remain stable or permanent only in the first posture or in the second posture.

According to one embodiment, the first magnetic elements and the second magnetic element can exert a magnetic force on each other such that the second magnetic element is arranged on one of the first magnetic elements in the first posture or position of the communication means and is arranged on the other of the first magnetic elements in the second posture or position of the communication means. Advantageously, the first magnetic elements and the second magnetic element can exert a magnetic force on each other such that it is magnetically impossible for the second magnetic element to remain between the first magnetic elements. In particular, an intermediate posture between the first magnetic elements may be unstable for the second magnetic element. Preferably, a second magnetic element located at an intermediate posture between the first magnetic elements can be automatically returned from the intermediate posture to the first posture or to the second posture. For this purpose, the first magnetic elements and the second magnetic element can be configured to exert a particularly strong magnetic attraction force on each other at the first posture and at the second posture. In an intermediate posture between the first posture and the second posture, a magnetic attractive force can be substantially smaller, equal to zero or even magnetically repulsive, so that the second magnetic element is immediately driven back from an energetically or force-wise unfavorable intermediate posture either into the first posture or into the second posture without requiring any user activity for this.

According to one embodiment, the first magnetic elements can generate a magnetic field or be designed to generate a magnetic field. In particular, the first magnetic elements can generate a permanent magnetic field. Preferably, the first magnetic elements may be made of a permanent magnetic material, for example a ferromagnetic material.

According to one embodiment, the second magnetic element may comprise a magnetizable material that need not itself be a permanent magnet. For example, the second magnetic element may comprise or consist of iron. The second magnetic element may be configured to be subject to magnetic attraction by the first magnetic elements. In other words, the second magnetic element may be subjected to a magnetic force by the first magnetic elements. This magnetic force may be particularly attractive in the first posture and in the second posture, and may exhibit a local maximum of a magnetic attraction force in each of these two positions.

Alternatively, it is also possible to form the first magnetic elements from a magnetizable material such as iron or to form them in such a way that they are subject to magnetic attraction by the second magnetic element. In such an embodiment, the second magnetic element may be formed to generate a magnetic field, preferably be permanent magnetic. Furthermore, it is possible to manufacture both the first magnetic elements and the second magnetic element from a permanent magnet.

According to one embodiment, the first magnetic elements may be magnetic rings having a central opening, with the string passing through the central openings. Preferably, the second magnetic element fixedly attached to the string may pass through a respective one of the central openings of the first magnetic elements. For example, in the first posture of the communication means, the second magnetic element may be positioned in the opening of a first magnetic element formed as a magnetic ring. Similarly, in the second posture of the communication means, the second magnetic element may be positioned in the opening of another first magnetic element formed as a magnetic ring. When closed magnetic rings are provided as first magnetic elements, a substantially constant magnetic attractive force can act on the second magnetic element arranged in a respective central ring opening in the circumferential direction, which particularly reliably allows the second magnetic element to remain only at the position of one or the other first magnetic element and precludes the permanent assumption of an intermediate posture. According to one embodiment, the second magnetic element may fully surround the string. For example, the second magnetic element may be a circular cylindrical body having a through opening into which the string is inserted. The second magnetic element may be fixedly attached to the string, for example pressed thereon or glued thereto.

According to one embodiment, the self-securing device may comprise a housing in which at least a part of the control mechanism is arranged. In particular, a portion of a movable string of the communication means may be movably disposed within the housing. Further, a portion of a sheath of the communication means surrounding the string may be fixedly attached to the housing. For example, the housing may be formed to enclose at least a portion of the communication means. By means of such a housing, not only can the control mechanism be protected from mechanical stresses, but additionally a correct relative positioning between a string and a sheath of the communication means can be ensured. For example, the communication means can be a Bowden cable consisting of a metal string and a surrounding sheath (for example made of plastic or fabric), whereby the metal string can be designed to be displaceable relative to the sheath. By fixing the sheath to the housing and accommodating a part of the string longitudinally movable in the housing, a basis for adjusting a relative position between the sheath and the string can be provided.

According to one embodiment, the sheath may be interrupted in a central region of the housing, thereby exposing the string. In particular, at or in the region of opposite free ends of the interrupted sheath in the housing, each of the free ends may be surrounded by a sheathing fixedly attached to the sheath. Such a sheathing may locally thicken the sheath, which facilitates positional adjustment of the sheath relative to the string.

According to a preferred embodiment, an arrangement or sequence of, for example, parallel grooves may each be formed on opposite sides of the housing, with a respective pair of securing rings inserted into two spaced-apart grooves of each of the arrangements. Further, between each pair of securing rings in a respective arrangement or sequence of grooves, a respective one of the sheathings may be displacement-secured. Most advantageously, this configuration permits precise spatial adjustment between the sheath and the string of the communication means, particularly when the latter is in the form of a Bowden cable. To perform such an adjustment, two securing rings can be inserted into two grooves of a respective groove sequence of said arrangement. The two securing rings can be inserted into correspondingly suitable grooves at such a distance from each other that the sheathing can be inserted just between these two securing rings at the exposed ends of the sheath. This adjustment can be made at both opposite exposed ends of the sheath, so that each of the two sheathings is secured against longitudinal displacement in the longitudinal direction between two securing rings arranged in grooves. Since the sheathings are firmly attached to the casing, this also protects the casing from undesirable longitudinal displacement. By selecting twice two grooves for inserting the locking washers, the sheath can be shifted longitudinally over a certain range for adjustment. The string, on the other hand, can be moved freely over a certain spatial range as required to transfer the communication means between the stable first posture and the stable second posture. In this way, a desired spatial relationship between the sheath and the string can be variably and precisely adjusted. For example, for shifting between the first posture and the second posture, the string can be shifted by a value in a range between 2 mm and 20 mm, for example by 8 mm. The described adjustment possibility can enable a precise definition of the first posture and the second posture. This can make an additional contribution to eliminating undesirable intermediate postures or misalignments.

According to one embodiment, the first magnetic elements may be arranged stationary in the housing. Furthermore, the second magnetic element can be arranged fixed to the string and movable relative to the housing. In this way, the housing can protectively surround the magnetic elements without undesirably affecting their functionality.

According to one embodiment of the invention, the fastening elements, in particular designed as carabiners, can be blocked against opening by means of a respective blocking device of a respective fastening element. These blocking devices of the two fastening elements can be coupled by means of the communication means. Furthermore, a securing means (for example a key or bolt on a securing element designed, for example, as a securing rope) can be provided for the fastening elements, which, when a fastening element is hooked into the securing element and the securing means is actuated, blocks this fastening element against opening by means of its blocking device. Furthermore, triggered by this actuation of the securing means, the communication means can actuate the blocking device of the second fastening element in such a way that the second fastening element is released for opening. In this way, it can be ensured that only one of the fastening elements can be opened at any time. The described function can be realized, for example, as described in WO 2008/049143 A1. According to an embodiment, the first fastening element may be a first carabiner. In a corresponding manner, the second fastening element may be a second carabiner. Instead of carabiners, fork pieces, eyelets, catches, etc. are also possible as fastening elements. As an alternative to carabiners, other fastening elements that can be coupled in a communicable manner by means of a communication means can also be used, for example a hook with an adjustable gate or a body with a mouth opening that can be selectively closed by a sliding or snapping mechanism.

According to one embodiment, the communication means may be selected from a group consisting of a Bowden cable, a hydraulic communication means and a pneumatic communication means. Thus, for example, a mechanical pull wire or a fluid line can be used as a force coupling mechanism between the fastening elements, which can trigger the activation of an actuability or the locking of a respective fastening element. As an alternative to a Bowden cable, the communication means can thus also comprise a fluid line, for example for a hydraulic or pneumatic coupling of the two carabiners, or the like.

A Bowden cable can advantageously connect two carabiners of a self-securing device and serve to prevent simultaneous opening of two carabiners. If a user moves along a belay device (for example, a rope) that is stretched between a plurality of poles or the like arranged next to each other as attachment points, it is necessary to re-hook the carabiners at each pole. If both carabiners of a self-securing device are released simultaneously, a fall of the user during re-hooking would not be reliably excluded. However, by providing a Bowden cable between the two carabiners, unhooking of one carabiner can be made dependent on whether the other carabiner is currently closed or not.

According to one embodiment, the communication means has a single Bowden cable. Alternatively, it is possible to form the communication means by means of two (or more) Bowden cables, which can be formed abutting and/or adjacent to each other.

According to one embodiment, the self-securing device may comprise a belt, in particular a waist belt or a chest and waist belt, coupled to the first fastening element and to the second fastening element. For coupling such a belt to the fastening elements, for example, straps, in particular sewn textile straps, or can be used another connecting means.

It is also possible to design at least one of the fastening elements to be lockable or unlockable by a key or the like in order to achieve improved security. Such a key can be a mechanical key, or an electrical, magnetic or inductive key. Optical keys are also possible.

A self-securing device according to embodiments of the invention can be used, for example, for occupational safety or as a climbing set. However, such a self-securing device can also be used for recreational activities, such as in climbing parks. Thus, the self-securing device can be used both in climbing parks, on secured climbing climbs or also for work on house facades, roofs, bridges, masts, etc. or also in shipping, in particular for sailboats. Exemplary embodiments of the present invention are described in detail below with reference to the following figures.

BRIEF DESCRIPTION OF THE DRAWINGS

Identical or similar components in different figures are given the same reference numerals.

Figure 1:
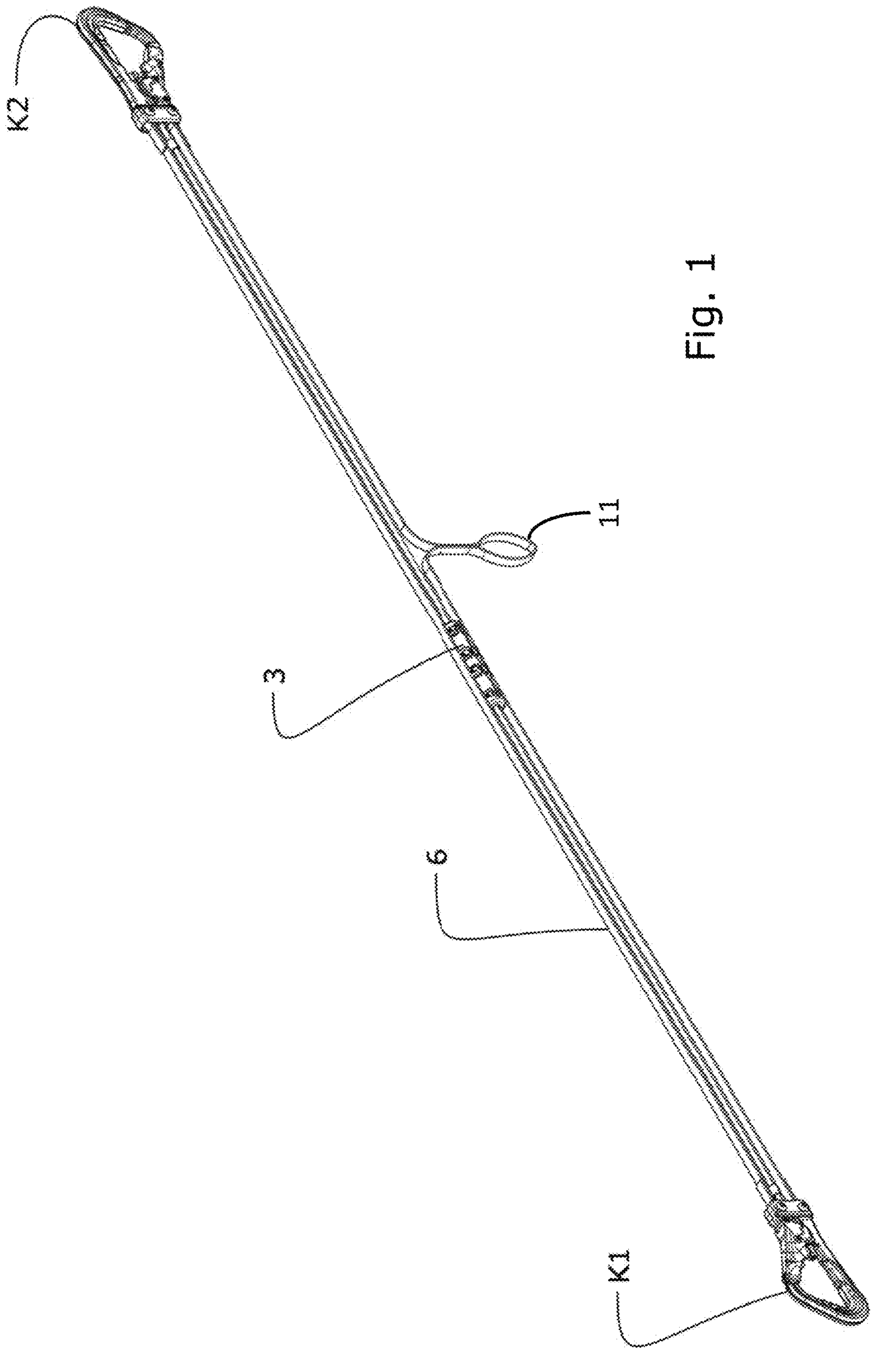
FIG. 1 and FIG. 2 show two views of a self-securing device according to an exemplary embodiment of the invention.

Before describing exemplary embodiments of the invention with reference to the figures, some general aspects of embodiments of the invention will be explained:

According to an exemplary embodiment of the invention, a control for a communicating self-securing device can be created with which undefined intermediate states can be avoided. As a result, the safety of a self-securing device can be improved. At the same time, an uninterrupted operability of the self-securing device can be ensured. More specifically, according to an exemplary embodiment of the invention, a control device for communicating fastening elements of a self-securing device is provided, which ensures that always exactly one fastening element of the self-securing device is closed, whereas the other fastening element of the self-securing device can be opened. Furthermore, according to an exemplary embodiment of the invention, a system is provided in which a plurality of self-securing devices with this control is used.

A self-securing device of this type can also be referred to as a communicating self-securing set (especially a climbing set). Such a communicating self-securing device is used for the safety of climbers on climbing routes or high ropes courses. However, such self-securing devices can also be used for exposed work on house facades, roofs, bridges, masts, etc., as well as in shipping, especially for sailboats. A communicating self-securing device can have two carabiners or other fastening elements, each of which is connected to the person securing himself via a connecting piece designed, for example, as a rope or as a strap. Here, for example, a safety harness such as a waist belt may be used for the person securing himself. The two carabiners can be attached, for example, to the free ends of a Y- or V-shaped rope or strap, which rope or strap is provided in the middle or near the middle with an attachment device for attachment to a safety belt of the person securing himself. The two carabiners may additionally be connected to each other by a communication means, for example a Bowden cable system. This communication means is intended to ensure that only one of the two carabiners can be opened alternately at any one time, while the other carabiner is blocked against opening.

Communicating self-securing devices are intended to ensure that one carabiner is always reliably locked to the rope, whereas the other carabiner can be opened. This ensures that both carabiners can never be removed from the belay guide, for example a steel cable, at the same time and thus that the person connected to the self-securing device is always secured against falling by means of at least one carabiner.

This can be achieved by a communicative connection, for example by means of a Bowden cable. By moving a string cable inside the Bowden cable, one carabiner can thus always be locked and at the same time the lock of the other carabiner can be unlocked. The string cable should therefore only move between two desired positions. In a desired first position or posture, the first carabiner is locked and at the same time the second carabiner is unlocked. In another desired second position or posture, the first carabiner is unlocked and at the same time the second carabiner is locked.

Here, the following problem arises in conventional securing devices: In communicating securing systems, it has been shown in the past that the string cable of the Bowden wire repeatedly remained permanently in an undefined and undesirable rather stable intermediate posture between the two desired positions. This can be caused by the string shifting due to vibration or shock, which is very common when using a ropes course. Furthermore, it happens that by twisting the system and the carabiners, the string of the Bowden cable moves independently into this intermediate posture, or that the user does not properly perform the locking/unlocking operation of the carabiners to their full length. In this undesired intermediate posture, either both carabiners were now locked, or both carabiners were unlocked.

If both carabiners are locked, the secured person is reliably secured against falling, but cannot remove one of the carabiners from the rope and thus cannot switch to the next ropes course exercise. This leads to a malfunction or loss of function.

If both carabiners are unlocked, the belayed person can switch to the next ropes course exercise, but has the option of removing both carabiners from the belay rope at the same time. This means an unsecured situation which, in the worst case, can lead to the user falling from a great height.

Exemplary embodiments of the invention prevent the permanent assumption of an undefined intermediate posture between the two defined and desired positions, in which in each case one of the carabiners can be opened and the other carabiner is locked. This is accomplished by a preferably magnetic control mechanism which makes it impossible to remain in an undefined intermediate posture.

DETAILED DESCRIPTION

Figure 2:
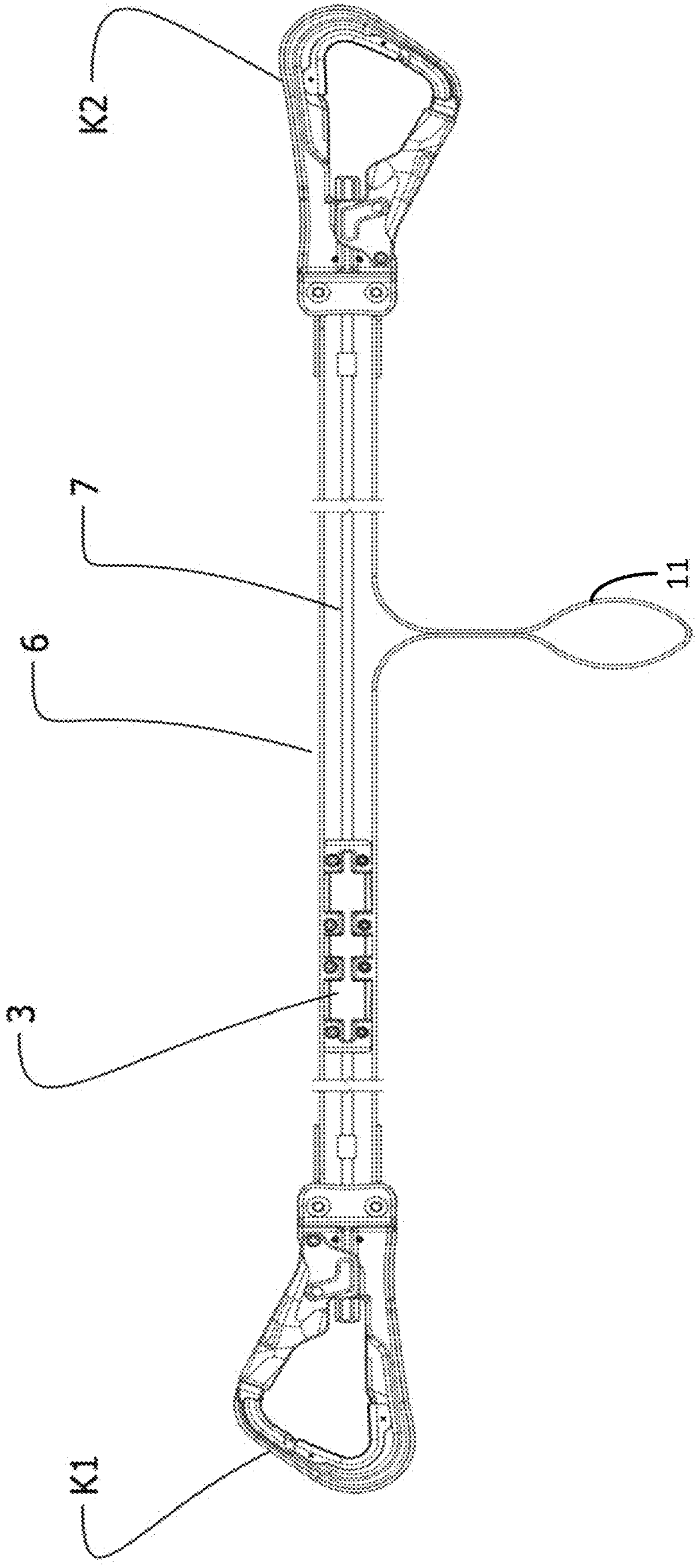
Figure 3:
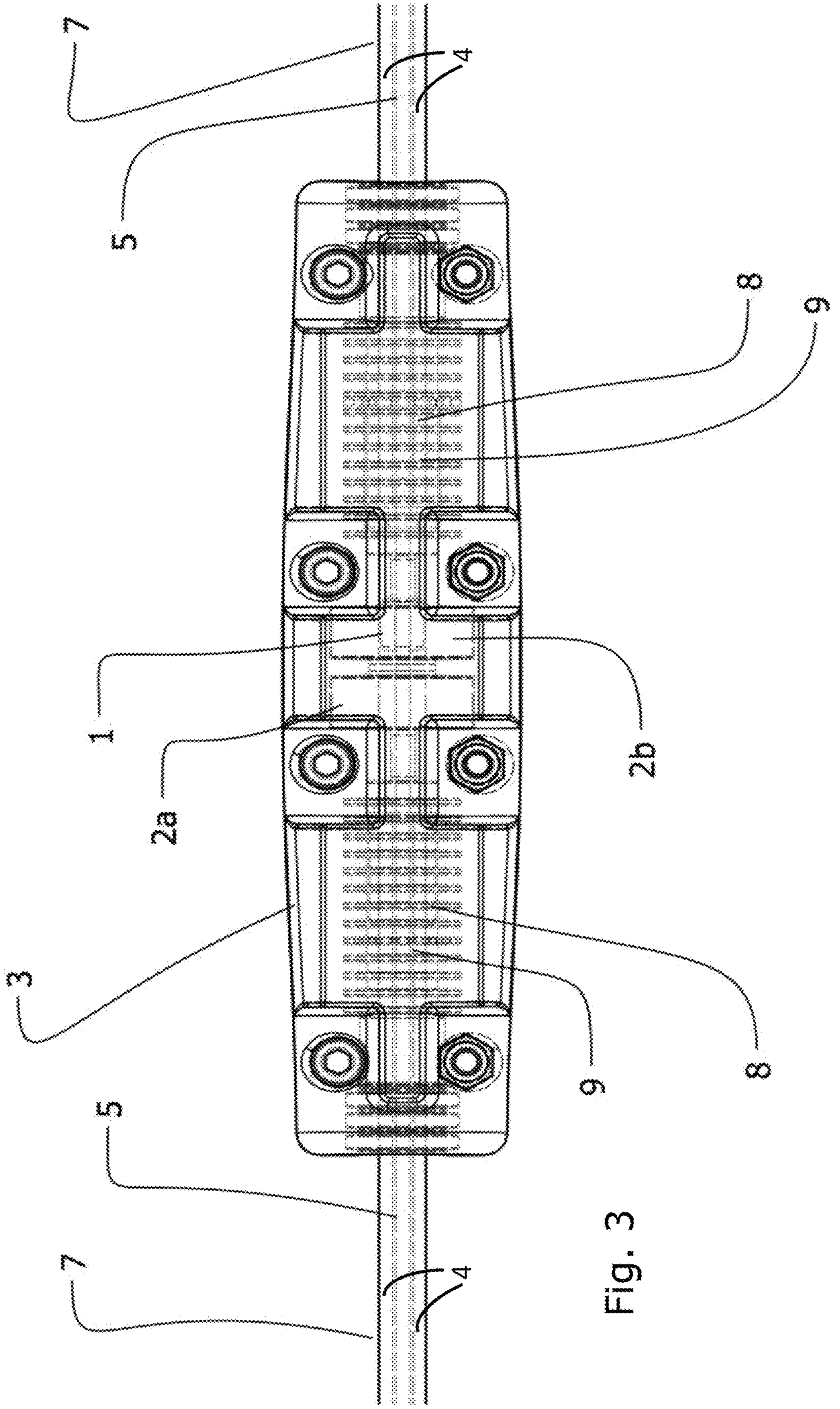
FIG. 3 shows a control mechanism in a housing of the self-securing device according to FIG. 1 and FIG. 2.
Figure 4:
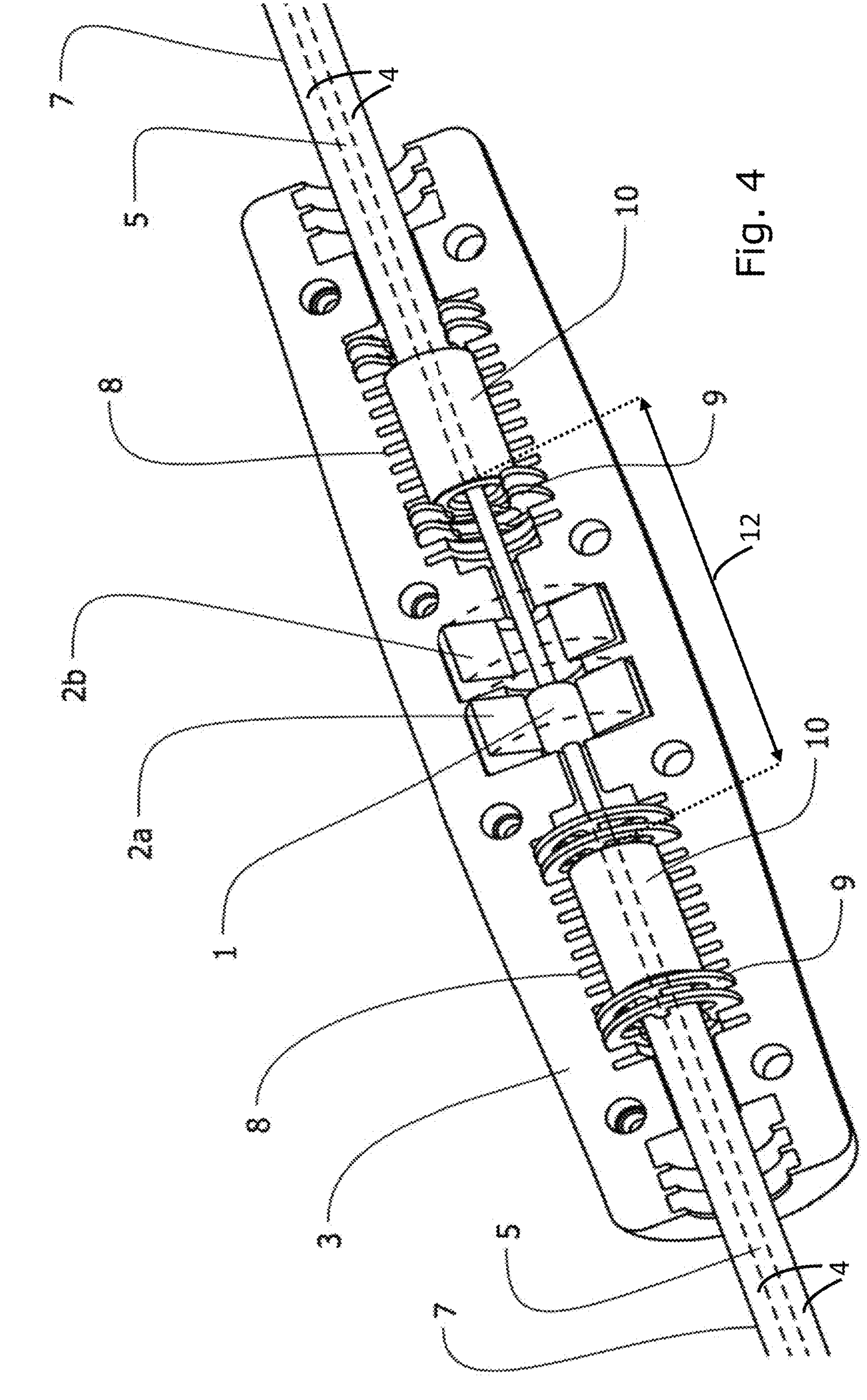
FIG. 4 and FIG. 5 show the control mechanism according to FIG. 3 in two different positions of a communication means.
Figure 5:
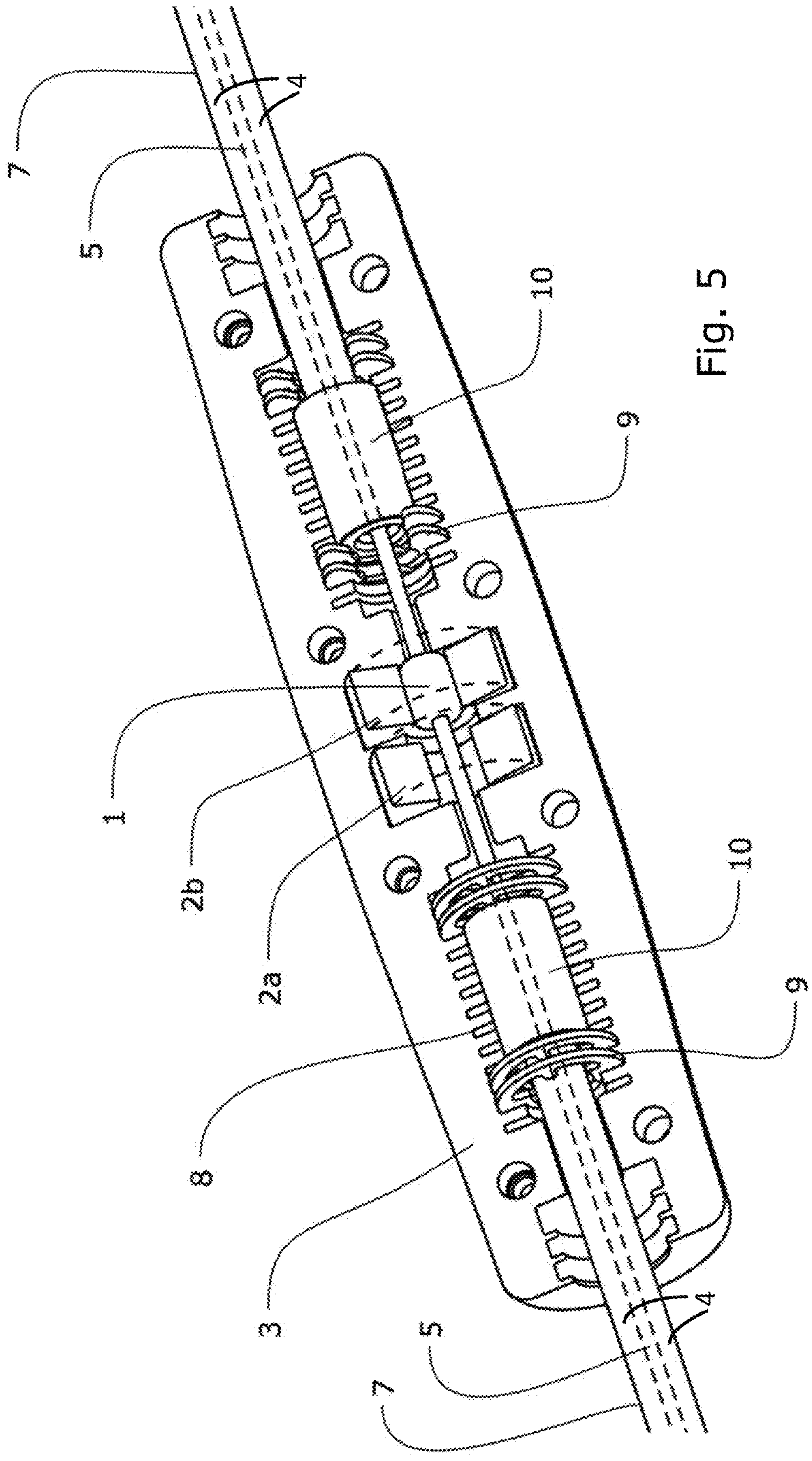

FIG. 1 and FIG. 2 show two views of a self-securing device according to an exemplary embodiment of the invention. FIG. 3 shows a control mechanism in a housing 3 of the self-securing device according to FIG. 1 and FIG. 2. FIG. 4 and FIG. 5 show the control mechanism according to FIG. 3 in two different positions of a communication means 7.

FIG. 1 and FIG. 2 thus show a self-securing device for securing a person according to an exemplary embodiment of the invention. The self-securing device shown has a first fastening element K1 in the form of a first carabiner for fastening to a securing element not shown (for example a safety rope). Furthermore, a second fastening element K2 designed here as a second carabiner is provided for fastening to the same or another securing element. The two fastening elements K1, K2 are connected to each other via a flexible connecting means 6, which serves as a fall protection. For example, the connecting means 6 can comprise a sewn textile strap.

Along (for example on and/or in) the connecting means 6 runs a communication means 7 operatively connected to the two fastening elements K1, K2. Preferably, the communication means 7 is designed as a Bowden cable. For example, such a Bowden cable can be embedded in a textile tube which can be sewn to the connecting means 6. FIG. 1 and FIG. 2 each show a loop 11 at which the illustrated self-securing device can be connected to a harness (not shown) worn by a user.

The communication means 7 serves to communicate between the first fastening element K1 and the second fastening element K2 in such a way that, in a first posture of the communication means 7, the first fastening element K1 is actuatable (i.e. the first carabiner can be opened) and the second fastening element K2 is blocked (i.e. the second carabiner cannot be opened). In a second posture of the communication means 7, on the other hand, the first fastening element K1 is blocked (i.e. the first carabiner cannot be opened) and the second fastening element K2 can be actuated (i.e. the second carabiner can be opened).

The adjustment of the first posture or the second posture of the communication means 7 may be performed by a user actuation. This can be carried out, for example, by a user actuating a blocking device of a respective fastening element K1 or K2 (for example, by means of a securing means attached to a securing element, such as a securing rope, such as a securing pin or securing key). This actuation of the blocking device of a fastening element K1 or K2 can act on a blocking device of the respective other fastening element K2 or K1 by means of the communication means 7. This allows the fastening element K1 or K2 to be locked and the other fastening element K2 or K1 to be unlocked.

Advantageously, the self-securing device has a magnetic control mechanism for controlling the communication means 7 in such a way that the communication means 7 is reliably prevented from remaining in an undefined intermediate posture between the first posture and the second posture on the basis of set magnetic force ratios. Although the communication means 7 can briefly pass through an intermediate posture when switching between the first posture and the second posture, it does not remain there permanently because the magnetic forces of the control mechanism, which are described in more detail below, always force the communication means 7 into one of the first posture and the second posture. This makes it possible to ensure that at any point in time a user of the self-securing device is secured to the securing element by a locked one of the two fastening elements K1 or K2, while at the same time the respective other fastening element K2 or K1 can be removed from the securing element, which allows rehanging at any point in time. Other undesirable or undefined intermediate states cannot occur, in particular no unsafe simultaneous release of both fastening elements K1 and K2 and no function-disrupting simultaneous locking of both fastening elements K1 and K2. In the embodiment shown, all components of the control mechanism are integrated in a housing 3, through which a part of the communication means 7 designed as a Bowden cable is guided. This protects the components of the control mechanism against mechanical influences, dust and moisture.

Now referring to FIG. 3 to FIG. 5, the control mechanism in the housing 3 has two first magnetic elements 2*a*, 2*b* arranged next to each other, which are fixedly mounted in the housing 3. The communication means 7, which is in the form of a Bowden cable, has a string 5, which is in the form of a metal cable, and a sheath 4, inside which the string 5 is arranged so as to be displaceable relative to the sheath 4. A second magnetic element 1 is fixedly attached to the string 5 and, during operation, moves together with the string 5 relative to the sheath 4 and the housing 3. The first magnetic elements 2*a*, 2*b* are arranged stationarily in the housing 3, whereas the second magnetic element 1 is fixedly attached to the string 5 and movably arranged in the housing 3. If the string 5 moves from left to right or in the opposite direction during the transition between the first posture and the second posture relative to the sheath 4 as shown in FIG. 3, the second magnetic element 1 consequently moves along with the string 5. On the other hand, the string 5 of the communication means 7 performs a relative movement to the first magnetic elements 2*a*, 2*b* during its transfer between the first posture and the second posture.

The first magnetic elements 2*a*, 2*b* and the second magnetic element 1 are configured to exert a magnetic force on each other such that the second magnetic element 1 is positioned at the first magnetic element 2*a* in the first posture or position of the communication means 7 and is positioned at the other first magnetic element 2*b* in the second posture or position of the communication means 7. More specifically, the first magnetic elements 2*a*, 2*b* and the second magnetic element 1 exert a magnetic attraction force on each other such that it is magnetically impossible for the second magnetic element 1 to remain between the first magnetic elements 2*a*, 2*b*. The magnetic attraction force may have a local maximum at a position of the second magnetic element 1 corresponding to each of the first posture and the second posture, and may rapidly decrease sharply in an intermediate region. Due to these magnetic force conditions, even if the second magnetic element 1 is briefly at a position between the first posture and the second posture, the second magnetic element 1 is immediately self-retracted to the first posture or the second posture. Remaining in the unstable or unstable intermediate posture between the first magnetic elements 2*a*, 2*b* is impossible for the second magnetic element 1 due to the described force or potential relationships. Advantageously, an automatic return of the second magnetic element 1 and consequently of the string 5 of the communication means 7 into the first posture or into the second posture is associated with a perceptible and audible feedback to a user. This acoustic or haptic feedback represents an intuitively perceptible confirmation of correct operation of the self-securing device for a user, in particular when switching between the first posture and the second posture.

Preferably, the first magnetic elements 2*a*, 2*b* are formed as permanent magnets made of a hard magnetic material in order to permanently generate a magnetic field. The second magnetic element 1, on the other hand, can be formed as a body made of a magnetizable material, such as iron. Advantageously, according to FIG. 3 to over 5, the first magnetic elements 2*a*, 2*b* are magnetic rings with a central opening into which the string 5 together with the second magnetic element 1 firmly attached thereto can be inserted. The circular cylindrical second magnetic element 1 fits into each of the central openings and fully surrounds the string 5. The second magnetic element 1 may be configured to be magnetically attracted to the first magnetic elements 2*a*, 2*b* to be automatically located in the area of one of the first magnetic elements 2*a* or 2*b*. In the area between the first magnetic elements 2*a*, 2*b*, the magnetic attraction force on the second magnetic element 1 is either much smaller, or a magnetic repulsion force may also be realized there. Although a shaping of the first magnetic elements 2*a*, 2*b* as magnetic rings is preferred, the magnetic elements 2*a*, 2*b* can also have other shapes.

As already mentioned, the self-securing device has the housing 3 in which the described components 1, 2*a*, 2*b* of the magnetic control mechanism are housed in a protected manner. The housing 3 may be located at any position of the connecting means 6, in the illustrated embodiment in the area of the loop 11. However, it is also possible that the housing 3 is located adjacent to the first fastening element K1 or adjacent to the second fastening element K2.

As described above, a part of the string 5 of the communication means 7 movable in the longitudinal direction and relative to the sheath 4 is movably arranged in the housing 3. Furthermore, a part of the sheath 4 of the communication means 7 surrounding a partial area of the string 5 is fixedly and immovably attached to the housing 3. As can be readily seen in FIG. 4, in a central region 12 of the housing 3 the sheath 4 is interrupted so that the string 5 is exposed in the region 12. At opposite free ends of the interrupted sheath 4 in the housing 3, each of the free ends of the sheath 4 is surrounded by a respective sheathing 10 fixedly attached to the sheath 4. The sheathings 10 are each in the form of a circular cylinder with a central through hole.

Advantageously, an arrangement of equidistant grooves 8 is formed on each of opposite sides of the housing 3. A respective pair of securing rings 9 is inserted in two spaced grooves 8 of each of the arrangements. A spacing of two securing rings 9 in two grooves 8 of an arrangement corresponds substantially to an axial length of the associated sheathing 10. Indeed, a respective one of the sheathing 10 is inserted between each pair of securing rings 9 and is thereby arranged to be secured against displacement. The measures described allow positional adjustment between the string 5 and the sheath 4 of the communication means 7.

Due to the described functionality of the housing 3 and the components arranged therein, the fastening elements K1, K2, which are designed as carabiners, can be lightweight and of simple construction. Advantageously, the housing 3 can be positioned in the area of the belly button of a user during operation, so that the self-securing device is conveniently portable.

The self-securing device shown in the figures is configured to reliably prevent a dangerous or function-impairing intermediate posture of the communication means 7 between the first posture and the second posture as described above. Furthermore, the provision of the grooves 8 in conjunction with the locking rings 9 and the sheathing 10 allows for an adjustment of the string 5 relative to the sheath 4 to be made, for example at the factory, which also promotes a correct positioning of the magnetic elements 1, 2*a*, 2*b* relative to each other.

The communication means 7 designed as a Bowden cable and the string 5 located therein can thus be guided through the housing 3. The housing 3 is permanently connected to the sheath 4 of the communication means 7 and can be positioned anywhere on the communication means 7, which is designed as a Bowden cable. In this respect, it can also be permanently connected to one of the two fastening elements K1 or K2 designed as a carabiner or integrated in one of the two fastening elements K1 or K2. The iron core-subjected to magnetic attraction—which forms the second magnetic element 1 is attached to the string 5 of the communication means 7. This iron core or an otherwise formed second magnetic element 1 can move exclusively between the two first magnetic elements 2*a* and 2*b*, which are preferably formed as magnetic rings. The magnetic fields of the two first magnetic elements 2*a* and 2*b* are arranged next to each other, whereby repulsive poles can face each other. Therefore, no stable non-magnetic center position exists. The second magnetic element 1 and the metal cable attached thereto, which can form the string 5, can therefore only oscillate between the two first magnetic elements 2*a*, 2*b* and cannot remain in an intermediate posture. In this way, the undesirable and dangerous intermediate posture can be reliably prevented in the case of self-securing sets communicating with Bowden cable.

At the same time, embodiments of the invention have the advantage that the changeover of the second magnetic element 1 between the magnetic fields can be perceived haptically and acoustically. This means that a user can clearly perceive a changeover process between the two fastening elements K1 and K2.

Simultaneously, the housing 3 also functions to adjust the length of the outer part of the Bowden cable, i.e., the sheath 4. This is advantageous in that it allows the lengths of the sheath 4 and the string 5 to be adjusted to each other. This function can be provided by the housing 3 having a plurality of grooves 8, one behind the other, on both sides in the longitudinal direction towards the communication means 7. In one of these grooves 8, for example, a metal ring or other securing ring 9 is inserted which fixes the end of the sheathing 10 (which may, for example, be pressed onto the sheath 4) of the communication means 7.

In FIG. 4 and FIG. 5 it can be seen how the second magnetic element 1 is attracted by the respective ring magnet which forms the respective first magnetic element 2*a* or 2*b*. This allows the string 5 of the communication means 7 to be held in the respective desired position.

Supplementally, it should be noted that "comprising" does not exclude other elements or steps, and "one" or "a" does not exclude a plurality. It should further be noted that features or steps that have been described with reference to any of the above embodiments may also be used in combination with other features or steps of other embodiments described above. Reference signs in the claims are not to be regarded as a limitation.

What is claimed is:

1. A self-securing device for securing a person, the self-securing device comprising:

- a first fastening element for fastening to a securing element;
- a second fastening element for fastening to the securing element or a further securing element;
- a communication means for communicating between the first fastening element and the second fastening element such that, in a first posture of the communication means, the first fastening element is actuatable and the second fastening element is locked, and, in a second posture of the communication means, the first fastening element is locked and the second fastening element is actuatable; and
- a control mechanism for controlling the communication means to prevent the communication means from remaining in an undefined intermediate posture between the first posture and the second posture,
- wherein the control mechanism comprises two juxtaposed first magnetic elements with respect to which a string of the communication means is movable, and a second magnetic element fixedly attached to the string.

2. The self-securing device of claim 1, wherein the control mechanism is a magnetic control mechanism.

3. The self-securing device according to claim 1, wherein the first magnetic elements and the second magnetic element exert a magnetic force on each other such that the second magnetic element is arranged on one of the first magnetic elements in the first posture of the communication means, and is arranged on the other of the first magnetic elements in the second posture of the communication means.

4. The self-securing device according to claim 1, wherein the first magnetic elements and the second magnetic element exert on each other such a magnetic force that it is magnetically impossible for the second magnetic element to remain between the first magnetic elements, in particular that a second magnetic element located at an intermediate posture between the first magnetic elements is automatically returned from the intermediate posture to the first posture or to the second posture.

5. The self-securing device according to claim 1, comprising at least one of the following features:

- wherein the first magnetic elements generate a magnetic field;
- wherein the second magnetic element comprises a magnetizable material;

wherein the first magnetic elements are made of a permanent magnetic material;

wherein the second magnetic element comprises or consists of iron;

wherein the first magnetic elements being magnetic rings having a central opening, said string being passed through said central openings;

wherein the second magnetic element fully surrounding said string.

6. The self-securing device according to claim 1, comprising a housing in which at least part of the control mechanism is arranged, wherein in particular part of a movable string of the communication means is movably arranged in the housing and part of a sheath of the communication means surrounding the string is fixedly attached to the housing.

7. The self-securing device according to claim 6, wherein in a central region of the housing the sheath is interrupted and thereby the string is exposed, and wherein in particular at opposite free ends of the interrupted sheath in the housing each of the free ends is surrounded by a sheathing fixedly attached to the sheath.

8. The self-securing device according to claim 7, wherein an array of grooves is formed on opposite sides of said housing, respectively, wherein a respective pair of securing rings is inserted into two spaced grooves of each of said arrays, and wherein a respective one of said sheathings is displacement-secured between each pair of securing rings.

9. The self-securing device according to claim 6, wherein the control mechanism comprises two juxtaposed first magnetic elements with respect to which a string of the communication means is movable, and a second magnetic element fixedly attached to the string;

wherein the first magnetic elements are arranged stationary in the housing and the second magnetic element is arranged fixed to the string and movable in the housing.

* * * * *